United States Patent
Akizuki et al.

(10) Patent No.: US 9,947,934 B2
(45) Date of Patent: Apr. 17, 2018

(54) CATALYST AND ELECTRODE CATALYST LAYER, MEMBRANE ELECTRODE ASSEMBLY, AND FUEL CELL USING THE CATALYST

(71) Applicants: NISSAN MOTOR CO., LTD., Yokohama-shi, Kanagawa (JP); NIPPON STEEL & SUMIKIN CHEMICAL CO., LTD., Tokyo (JP)

(72) Inventors: Ken Akizuki, Nishitokyo (JP); Atsushi Ohma, Yokohama (JP); Tetsuya Mashio, Yokohama (JP); Yoshitaka Ono, Yokohama (JP); Shinichi Takahashi, Miura-gun (JP)

(73) Assignees: NISSAN MOTOR CO., LTD., Yokohama-shi (JP); NIPPON STEEL & SUMIKIN CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 14/786,632

(22) PCT Filed: Apr. 14, 2014

(86) PCT No.: PCT/JP2014/060643
§ 371 (c)(1),
(2) Date: Oct. 23, 2015

(87) PCT Pub. No.: WO2014/175105
PCT Pub. Date: Oct. 30, 2014

(65) Prior Publication Data
US 2016/0072133 A1   Mar. 10, 2016

(30) Foreign Application Priority Data
Apr. 25, 2013   (JP) .................... 2013-092930

(51) Int. Cl.
H01M 4/86   (2006.01)
H01M 4/92   (2006.01)
(Continued)

(52) U.S. Cl.
CPC ............. H01M 4/8657 (2013.01); B22F 9/02 (2013.01); C22F 1/02 (2013.01); C22F 1/14 (2013.01);
(Continued)

(58) Field of Classification Search
CPC . H01M 2004/8684; H01M 2008/1095; H01M 2250/20; H01M 4/8657;
(Continued)

(56) References Cited

U.S. PATENT DOCUMENTS

| 5,866,423 A | 2/1999 | Sugawara et al. |
| 6,242,260 B1 | 6/2001 | Sugawara et al. |

(Continued)

FOREIGN PATENT DOCUMENTS

| JP | 9-257687 A | 10/1997 |
| JP | 2004-025024 A | 1/2004 |

(Continued)

OTHER PUBLICATIONS

U.S. Appl. No. 14/786,056, filed Oct. 21, 2015, Nissan Motor Co., Ltd.

(Continued)

*Primary Examiner* — Carlos Barcena
(74) *Attorney, Agent, or Firm* — Foley & Lardner LLP

(57) ABSTRACT

The present invention has an object to provide a catalyst having excellent oxygen reduction reaction activity. The present invention relates to a catalyst comprising a catalyst support and a catalyst metal supported on the catalyst support, wherein a specific surface area of the catalyst per support weight is 715 $m^2$/g support or more or a covering (Continued)

ratio of the catalyst metal with an electrolyte is less than 0.5, and an amount of an acidic group of the catalyst per support weight is 0.75 mmol/g support or less.

14 Claims, 1 Drawing Sheet

(51) Int. Cl.
*H01M 4/88* (2006.01)
*H01M 4/90* (2006.01)
*H01M 8/10* (2016.01)
*B22F 9/02* (2006.01)
*C22F 1/14* (2006.01)
*C22F 1/02* (2006.01)
*H01M 8/1004* (2016.01)
*H01M 8/1018* (2016.01)

(52) U.S. Cl.
CPC ....... *H01M 4/8663* (2013.01); *H01M 4/8885* (2013.01); *H01M 4/9008* (2013.01); *H01M 4/92* (2013.01); *H01M 4/925* (2013.01); *H01M 4/926* (2013.01); *H01M 8/1004* (2013.01); *H01M 2004/8684* (2013.01); *H01M 2008/1095* (2013.01); *H01M 2250/20* (2013.01); *Y02T 90/32* (2013.01)

(58) Field of Classification Search
CPC ............. H01M 4/8663; H01M 4/8885; H01M 4/9008; H01M 4/92; H01M 4/925; H01M 4/926; H01M 8/1004
See application file for complete search history.

(56) References Cited

U.S. PATENT DOCUMENTS

| | | | |
|---|---|---|---|
| 9,156,694 B2 | 10/2015 | Morishita | |
| 2005/0282061 A1* | 12/2005 | Campbell | B01J 27/22 429/483 |
| 2006/0105232 A1* | 5/2006 | Tanuma | B82Y 30/00 429/129 |
| 2008/0182745 A1* | 7/2008 | Finkelshtain | H01M 4/921 502/101 |
| 2011/0058308 A1 | 3/2011 | Nishi et al. | |
| 2011/0223494 A1 | 9/2011 | Feaver et al. | |
| 2013/0244137 A1 | 9/2013 | Tada et al. | |

FOREIGN PATENT DOCUMENTS

| | | |
|---|---|---|
| JP | 2010-015970 A | 1/2010 |
| JP | 2010-208887 A | 9/2010 |
| JP | 2012-124001 A | 6/2012 |
| JP | 2013-131420 A | 7/2013 |
| WO | WO 2005/083818 A1 | 9/2005 |
| WO | WO 2009/075264 A1 | 6/2009 |
| WO | WO 2012/077598 A1 | 6/2012 |

OTHER PUBLICATIONS

U.S. Appl. No. 14/786,470, filed Oct. 22, 2015, Nissan Motor Co., Ltd.
U.S. Appl. No. 14/786,281, filed Oct. 22, 2015, Nissan Motor Co., Ltd.
U.S. Appl. No. 14/786,632, filed Oct. 23, 2015, Nissan Motor Co., Ltd.
U.S. Appl. No. 14/786,479, filed Oct. 22, 2015, Nissan Motor Co., Ltd.
U.S. Appl. No. 14/786,675, filed Oct. 23, 2015, Nissan Motor Co., Ltd.

\* cited by examiner

CATALYST AND ELECTRODE CATALYST LAYER, MEMBRANE ELECTRODE ASSEMBLY, AND FUEL CELL USING THE CATALYST

TECHNICAL FIELD

The present invention relates to a catalyst, particularly, an electrode catalyst used for a fuel cell (PEFC), and an electrode catalyst layer, a membrane electrode assembly and a fuel cell using the catalyst.

BACKGROUND ART

A polymer electrolyte fuel cell using a proton conductive solid polymer membrane operates at a low temperature in comparison to other types of fuel cells, for example, a solid oxide fuel cell or a molten carbonate fuel cell. For this reason, the polymer electrolyte fuel cell has been expected to be used as a power source for energy storage system or a driving power source for a vehicle such as a car, and practical uses thereof have been started.

In general, such a polymer electrolyte fuel cell uses expensive metal catalyst represented by platinum (Pt) or a Pt alloy, which leads to high cost of the fuel cell. Therefore, development of techniques capable of lowering the cost of the fuel cell by reducing a used amount of noble metal catalyst has been required.

For example, JP-A-2012-124001 (US 2013/244137 A1) discloses a catalyst for polymer electrolyte fuel cell having catalyst particles made of platinum supported on a carbon powder support. 0.7 to 3.0 mmol/g (in terms of support weight) of a hydrophilic group binds to the carbon powder support, the platinum particle has an average particle diameter of 3.5 to 8.0 nm, and a specific surface area (COMSA) of platinum by CO adsorption is in the range of 40 to 100 $m^2/g$. JP-A-2012-124001 (US 2013/244137 A1) discloses that initial activity (initial power generation characteristic) can be secured by introducing the hydrophilic group into the platinum catalyst which wettability has been degraded by an annealing process to make a functional group disappear from the surface of support.

SUMMARY OF INVENTION

The catalyst disclosed in JP-A-2012-124001 (US 2013/244137 A1), however, has problems in that the catalyst has insufficient oxygen reduction reaction activity, and thus, the catalyst activity is decreased.

The present invention has been made in light of the aforementioned circumstances and aims at providing a catalyst having excellent oxygen reduction reaction activity.

Another object of the present invention is to provide an electrode catalyst layer, a membrane electrode assembly, and a fuel cell having an excellent power generation performance.

The present inventors have intensively studied to solve the aforementioned problems, to find that the problems can be solved by a catalyst including a predetermined amount or less of an acidic group, and eventually the present invention has been completed.

BRIEF DESCRIPTION OF DRAWINGS

In FIG. 1, 1 denotes a polymer electrolyte fuel cell (PEFC), 2 denotes a solid polymer electrolyte membrane, 3a denotes an anode catalyst layer, 3c denotes cathode catalyst layer, 4a denotes an anode gas diffusion layer, 4c denotes a cathode gas diffusion layer, 5a denotes an anode separator, 5c denotes a cathode separator, 6a denotes an anode gas passage, 6c denotes a cathode gas passage, 7 denotes a coolant passage, and 10 denotes a membrane electrode assembly (MEA).

In FIG. 2, 20 denotes a catalyst, 22 denotes a catalyst metal, 23 denotes a support, 24 denotes a pore (mesopore), 25 denotes an acidic group, and 26 denotes an electrolyte.

DESCRIPTION OF EMBODIMENTS

Figure 1:
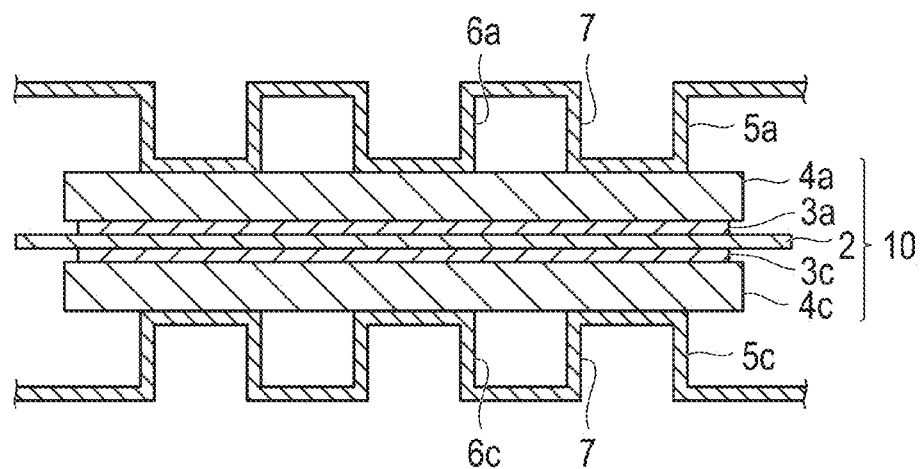
FIG. 1 is a schematic cross-sectional diagram illustrating a basic configuration of a polymer electrolyte fuel cell according to an embodiment of the present invention.

A catalyst (in this description, sometimes referred to as an "electrode catalyst") of the present invention is configured to comprise a catalyst support and a catalyst metal supported on the catalyst support. Herein, the catalyst satisfies the following features (a) and (b):

(a) a specific surface area of the catalyst per support weight is 715 $m^2/g$ support or more; and (b) an amount of an acidic group of the catalyst per support weight is 0.75 mmol/g support or less.

Also, the catalyst of the present invention is configured to comprise a catalyst support and a catalyst metal supported on the catalyst support. Herein, the catalyst satisfies the following features (c) and (b):

(c) a covering ratio of the catalyst metal with an electrolyte is less than 0.5; and (b) an amount of an acidic group of the catalyst per support weight is 0.75 mmol/g support or less.

In this description, a pore having a radius of less than 1 nm is referred to as "micropore". Also, in this description, a pore having a radius of 1 nm or more is referred to as "mesopore".

The present inventors have found that in the catalyst disclosed in the Patent Literature 1, if a specific surface area of the support is increased, surfaces of catalyst metals can be easily surrounded by an electrolyte (electrolyte polymer) or water, to decrease oxygen reduction reaction activity. On the contrary, the present inventors have found that an amount of the electrolyte or water existing on the surfaces of the catalyst metals can be reduced by decreasing an amount of acidic groups existing in the catalyst or suppressing a covering of catalyst metals with an electrolyte, to improve oxygen reduction reaction activity and to improve catalyst activity.

According to the present invention, by increasing an specific surface area of a catalyst, catalyst metals can be easily supported inside pores of a support, to suppress covering of a surface of catalyst metal with an electrolyte. Also, by decreasing a covering ratio of the electrolyte, the covering of the catalyst metal with an electrolyte can be suppressed. In addition, by decreasing an amount of acidic groups in the catalyst, an amount of water absorbed in pores of the catalyst can be suppressed, to decrease an amount of water existing in the vicinity of the catalyst metals. Therefore, the catalyst of the present invention has high oxygen reduction reaction activity and can exhibit high catalyst activity, and namely, the catalyst reaction can be facilitated. For this reason, the membrane electrode assembly and fuel cell comprising the catalyst layer using the catalyst according to the present invention have an excellent power generation performance.

Hereinafter, embodiments of a catalyst according to the present invention and embodiments of a catalyst layer, and a membrane electrode assembly (MEA) and a fuel cell using the catalyst will be described in detail appropriately with reference to the drawings. However, the present invention is not limited to the following embodiments. In addition, figures may be expressed in an exaggerated manner for the convenience of description, and in the figures, scaling factors of components may be different from actual values thereof. In addition, in the description of the embodiments of the present invention with reference to the drawings, the same components are denoted by the same reference numerals, and redundant description is omitted.

In this description, "X to Y" representing a range denotes "X or more and Y or less", and "weight" and "mass", "wt % and "mass %", "parts by weight", and "parts by mass" are used interchangeably. Unless otherwise noted, operation and the measurement of physical properties are performed at a room temperature (20 to 25° C.) and a relative humidity of 40 to 50%.

[Fuel Cell]

A fuel cell comprises a membrane electrode assembly (MEA) and a pair of separators including an anode-side separator having a fuel gas passage through which a fuel gas flows and a cathode-side separator having an oxidant gas passage through which an oxidant gas flows. The fuel cell according to the present embodiment has excellent durability and can exhibit a high power generation performance.

FIG. 1 is a schematic diagram illustrating a basic configuration of a polymer electrolyte fuel cell (PEFC) 1 according to an embodiment of the present invention. First, a PEFC 1 is configured to comprise a solid polymer electrolyte membrane 2 and a pair of catalyst layers (anode catalyst layer 3a and cathode catalyst layer 3c) interposing the solid polymer electrolyte membrane 2. A stacked body of the solid polymer electrolyte membrane 2 and the catalyst layers (3a, 3c) is sandwiched by a pair of gas diffusion layers (GDLs) (anode gas diffusion layer 4a and cathode gas diffusion layer 4c). In this manner, the solid polymer electrolyte membrane 2, a pair of the catalyst layers (3a, 3c), and a pair of gas diffusion layers (4a, 4c) in the stacked state constitute a membrane electrode assembly (MEA) 10.

In the PEFC 1, the MEA 10 is sandwiched by a pair of separators (anode separator 5a and cathode separator 5c). In FIG. 1, the separators (5a, 5c) are illustrated to be positioned at two ends of the MEA 10 illustrated. In general, in a fuel cell stack where a plurality of MEAs are stacked, the separator is also used as a separator for adjacent PEFC (not shown). In other words, MEAs in a fuel cell stack are sequentially stacked through the separator to constitute the stack. In an actual fuel cell stack, a gas sealing member is disposed between the separators (5a, 5c) and the solid polymer electrolyte membrane 2 and between the PEFC 1 and a different PEFC adjacent thereto. However, it is omitted in FIG. 1.

The separators (5a, 5c) are obtained by applying a pressing process to a thin board having a thickness of, for example, 0.5 mm or less to form a corrugating shape illustrated in FIG. 1. Convex portions of the separators 5a and 5c seen from the MEA side are in contact with the MEA 10. This secures an electrical connection with the MEA 10. Concave portions (spaces between the separator and the MEA formed by the corrugating shapes of the separators) of the separators (5a and 5c) seen from the MEA side function as a gas passage for passing a gas during the operation of the PEFC 1. Specifically, a fuel gas (for example, hydrogen) flows through a gas passage 6a of the anode separator 5a, and an oxidant gas (for example, air) flows through a gas passage 6c of the cathode separator 5c.

On the other hand, concave portions of the separators (5a, 5c) seen from the side opposite to the MEA side function as a coolant passage 7 for passing a coolant (e.g. water) for cooling the PEFC during the operation of the PEFC 1. In addition, manifolds (not shown) are typically installed in the separators. The manifold functions as a connecting means for connecting cells when the stack is configured. According to the configuration, a mechanical strength of the fuel cell stack can be secured.

In the embodiment illustrated in FIG. 1, each of the separators (5a, 5c) is formed in a corrugating shape. However, the separator is not limited to such a corrugating shape. If it can serve as a gas passage and a coolant passage, arbitrary shape such as a flat shape and a partially corrugating shape may be employed.

The fuel cell including the MEA according to the present invention as described above has excellent performance of power generation. Herein, the type of the fuel cell is not particularly limited. In the above description, the polymer electrolyte fuel cell is exemplified, but besides, an alkali fuel cell, a direct methanol fuel cell, a micro fuel cell, and the like may be exemplified. Among the fuel cells, due to a small size and capability of obtaining high density and high power, a polymer electrolyte fuel cell (PEFC) is preferred. In addition, the fuel cell is useful as a power source for energy storage system besides a power source for a vehicle such as a car where a mounting space is limited. Among the power sources, the fuel cell is particularly preferably used as a power source for a vehicle such as a car where a high output voltage is required after the stopping of operation for a relatively long time.

A fuel used for operating the fuel cell is not particularly limited. For example, hydrogen, methanol, ethanol, 1-propanol, 2-propanol, 1-butanol, secondary butanol, tertiary butanol, dimethyl ether, diethyl ether, ethylene glycol, diethylene glycol, or the like can be used. Among them, in view of capability of high output, hydrogen or methanol is preferably used.

In addition, although application use of the fuel cell is not particularly limited, the fuel cell is preferably applied to vehicles. The electrolyte membrane-electrode assembly according to the present invention has excellent power generation performance and durability, and can be downsized. Therefore, in terms of mountability on a vehicle, the fuel cell according to the present invention is particularly advantageous in the case where the fuel cell is applied to a vehicle.

Hereinafter, members constituting the fuel cell according to the present invention will be described in brief, but the scope of the present invention is not limited only to the following forms.

[Catalyst (Electrode Catalyst)]

Figure 2:
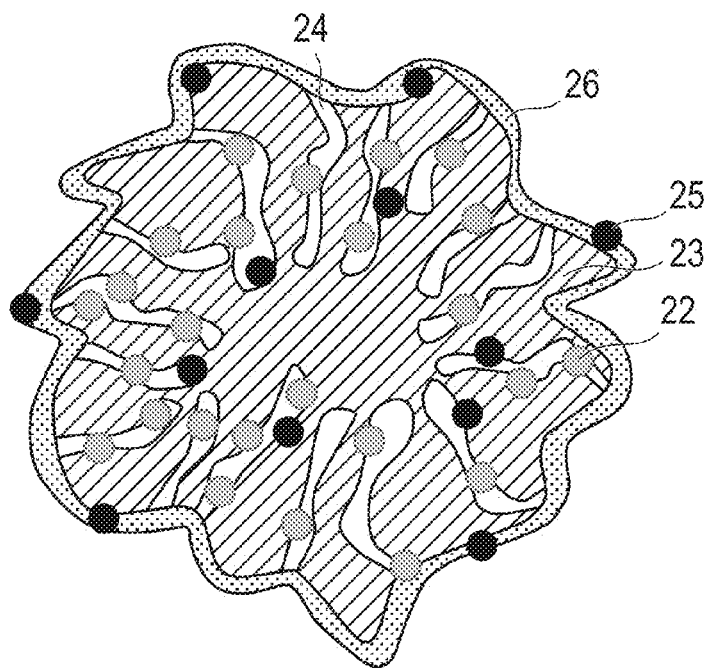
FIG. 2 is a schematic cross-sectional diagram illustrating a shape and a structure of a catalyst according to the present invention.

FIG. 2 is a schematic cross-sectional diagram illustrating a shape and a structure of a catalyst according to an embodiment of the present invention. As illustrated in FIG. 2, a catalyst 20 according to the present invention is configured to comprise catalyst metals 22 and a catalyst support 23. The catalyst 20 contains pores (micropores) 24. The catalyst 20 has an acidic group 25. The catalyst metal(s) 22 is supported inside the pores (mesopores) 24. In addition, at least a portion of the catalyst metals 22 may be supported inside the pores (mesopores) 24, and other portions thereof may be supported on the surface of the support 23. However, in terms of preventing the contact of the electrolyte with the catalyst metal, substantially all the catalyst metals 22 are preferably supported inside the mesopores 24. As used herein, the expression "substantially all the catalyst metals" is not particularly limited if an amount which can improve a sufficient catalytic activity can be attained. The amount of "substantially all the catalyst metals" is preferably 50 wt % or more (upper limit: 100 wt %), more preferably 80 wt % or more (upper limit: 100 wt %), with respect to all the catalyst metals.

A BET specific surface area (of a catalyst after catalyst metal(s) is supported) [BET specific surface area of catalyst per 1 g of support ($m^2$/g support)] is not particularly limited, but is 715 $m^2$/g support or more, preferably 1200 $m^2$/g support or more, more preferably 1700 $m^2$/g support or more. If the specific surface area is within the above-described range, since sufficient mesopores can be secured, a larger number of the catalyst metals can be placed (supported) in the mesopores. Therefore, covering of catalyst metals with an electrolyte in the catalyst layer can be suppressed (contact between catalyst metals and an electrolyte can be more effectively suppressed and prevented). Therefore, activity of the catalyst metals can be more effectively used, and catalyst reaction can be more effectively facilitated. An upper limit of the specific surface area is not particularly limited, but it is preferably 3000 $m^2$/g support or less.

In this description, the "BET specific surface area ($m^2$/g support)" is measured by a nitrogen adsorption method. Specifically, about 0.04 to 0.07 g of a catalyst powder is accurately weighed and sealed in a sample tube. The sample tube is preliminarily dried in a vacuum drier at 90° C. for several hours, to obtain a sample for measurement. For the weighing, an electronic balance (AW220) produced by Shimadzu Co., Ltd. is used. In the case of a coated sheet, about 0.03 to 0.04 g of a net weight of a coat layer obtained by subtracting a weight of Teflon (registered trademark) (substrate) having the same area from a total weight of the coated sheet is used as a sample weight. Next, under the following measurement condition, a BET specific surface area is measured. In an adsorption side of adsorption and desorption isotherms, a BET plot is produced from a relative pressure (P/P0) range of about 0.00 to 0.45, and a surface area and a BET specific surface area are calculated from the slope and the intercept.
[Chem. 1]
<Measurement Conditions>
Measurement Apparatus: BELSORP 36, High-Precise Automatic Gas Adsorption Apparatus produced by BEL Japan, Inc.
Adsorption Gas: $N_2$
Dead Volume Measurement Gas: He
Adsorption Temperature: 77 K (Liquid Nitrogen Temperature)
Measurement Preparation: Vacuum Dried at 90° C. for several hours (After He Purging, Set on Measurement Stage)
Measurement Mode: Adsorption Process and Desorption Process in Isotherm
Measurement Relative Pressure $P/P_0$: about 0 to 0.99
Equilibrium Setting Time: 180 sec for 1 relative pressure A method of manufacturing a catalyst having a specific pore distribution as described above is not particularly limited, but the methods disclosed in JP-A-2010-208887, WO 2009/75264, or the like are preferably used.

A material of the support is not particularly limited if the support has enough specific surface area and enough electron conductivity to support a catalyst component inside the mesopores in a dispersed state. Preferably, a main component is carbon. Specifically, carbon particles made of carbon black (Ketjen Black, oil furnace black, channel black, lamp black, thermal black, acetylene black, or the like), activated charcoal, or the like may be exemplified. The expression "main component is carbon" denotes that the support contains carbon atoms as a main component, and includes both of the configurations that the support consists only of carbon atoms and that the support substantially consists of carbon atoms. An element(s) other than carbon atom may be contained. The expression "substantially consists of carbon atoms" denotes that impurities of about 2 to 3 wt % or less can be contaminated.

More preferably, in view of easy formation of a desired pore space inside a support, carbon black is used; and particularly preferably, Black Pearls (registered trademark) 2000 is used.

In addition, for the purpose of improving corrosion resistance of a catalyst layer, it is preferable to control crystallinity of the carbon support. With respect to the crystallinity or crystalline composition of the carbon material, for example, a G-band peak intensity and a D-band peak intensity, as calculated by Raman spectroscopy, can be used.

Besides the aforementioned carbon, a porous metal such as Sn (tin) or Ti (titanium) or a conductive metal oxide such as $RuO_2$ and $TiO_2$ can also be preferably used as the support. By using such a metal oxide, corrosion of the support can be reduced, and durability of the catalyst can be further improved.

A BET specific surface area of a support may be a specific surface area enough to highly disperse and support a catalyst component thereon. The BET specific surface area of support is substantially equivalent to the BET specific surface area of catalyst. The BET specific surface area of support is preferably 800 $m^2$/g or more, more preferably 1400 $m^2$/g or more. If the specific surface area is within such a range, since sufficient mesopores can be secured, a larger number of the catalyst metals can be placed (supported) in the mesopores. Therefore, covering of catalyst metals with an electrolyte in the catalyst layer can be suppressed (contact between catalyst metals and an electrolyte can be more effectively suppressed and prevented). Therefore, activity of the catalyst metals can be more effectively used, and catalyst reaction can be more effectively facilitated.

An average particle diameter of a support is preferably in the range of 20 to 2000 nm. If the average primary particle diameter is within such a range, even in the case where the above-described pore structure is formed in the support, mechanical strength can be maintained, and a catalyst layer can be controlled within an appropriate range. As a value of the "average particle diameter of a support", unless otherwise noted, a value calculated as an average value of particle diameters of particles observed within several or several tens of fields by using observation means such as a scanning electron microscope (SEM) or a transmission electron microscope (TEM) is employed. In addition, the "particle diameter" denotes a maximum distance among distances between arbitrary two points on an outline of a particle.

In the present invention, there is no need to use the above-described granular porous support, so long as the support has the above-described BET specific surface area.

Namely, as the support, a non-porous conductive support, nonwoven fabric, carbon paper, carbon cloth, or the like made of carbon fiber constituting a gas diffusion layer, or the like may be exemplified. In this case, the catalyst can be supported on the non-porous conductive support or can be directly attached to the nonwoven fabric, the carbon paper, the carbon cloth, or the like made of the carbon fiber constituting the gas diffusion layer of the membrane electrode assembly.

A catalyst metal which can be used in the present invention performs catalysis of electrochemical reaction. As a catalyst metal used for an anode catalyst layer, a well-known catalyst can be used in a similar manner without particular limitation if the catalyst has catalytic effects on oxidation reaction of hydrogen. In addition, as a catalyst metal used for a cathode catalyst layer, a well-known catalyst can be used in a similar manner without particular limitation if the catalyst has catalytic effects on reduction reaction of oxygen. Specifically, the catalyst metal can be selected among metals such as platinum, ruthenium, iridium, rhodium, palladium, osmium, tungsten, lead, iron, copper, silver, chromium, cobalt, nickel, manganese, vanadium, molybdenum, gallium, and aluminum, and alloys thereof.

Among them, in view of improved catalytic activity, poison resistance to carbon monoxide or the like, heat resistance, or the like, a catalyst metal containing at least platinum is preferably used. Namely, the catalyst metal preferably is platinum or contains platinum and a metal component other than the platinum, more preferably is platinum or a platinum-containing alloy. Such a catalyst metal can exhibit high activity. Although a composition of an alloy depends on a kind of the metal constituting the alloy, a content of platinum may be in the range of 30 to 90 atom %, and a content of a metal constituting the alloy together with platinum may be in the range of 10 to 70 atom %. In general, an alloy is obtained by mixing a metal element with at least one metal element or non-metal element, and is a general term for substances having metallic properties. The structure of the alloy includes an eutectic alloy which is a mixture where component elements form separate crystals, an alloy where component elements are completely fused to form a solid solution, an alloy where component elements form a intermetallic compound or a compound between a metal and a non-metal, and the like, and any one thereof may be employed in the present application. A catalyst metal used in an anode catalyst layer and a catalyst metal used in a cathode catalyst layer can be appropriately selected from the aforementioned alloys. In this description, unless otherwise noted, the description of the catalyst metal for the anode catalyst layer and the catalyst metal for the cathode catalyst layer have the same definition. However, the catalyst metal for the anode catalyst layer and the catalyst metal for the cathode catalyst layer are not necessarily the same, and the catalyst metals can be appropriately selected so that the desired functions described above can be attained.

A shape and size of the catalyst metal (catalyst component) are not particularly limited, but the shapes and sizes of well-known catalyst components may be employed. As the shape, for example, a granular shape, a squamous shape, a laminar shape, or the like may be used, but the granular shape is preferred. In this case, an average particle diameter of catalyst metals (catalyst metal particles) is not particularly limited, but it is preferably 3 nm or more, more preferably more than 3 and 30 nm or less, particularly preferably more than 3 and 10 nm or less. If the average particle diameter of catalyst metals is 3 nm or more, the catalyst metals are relatively strongly supported in the mesopores, and contact with an electrolyte in a catalyst layer can be more effectively suppressed and prevented. In addition, elution due to a change in voltage can be prevented, and temporal degradation in performance can be also suppressed. Therefore, catalytic activity can be further improved, namely, catalyst reaction can be more efficiently facilitated. On the other hand, if the average particle diameter of the catalyst metal particles is 30 nm or less, the catalyst metals can be supported inside the mesopores of the supports by a simple method, so that a covering ratio of catalyst metals with an electrolyte can be reduced. In the present invention, the "average particle diameter of catalyst metal particles" can be measured as an average value of a crystallite diameter obtained from a half-value width of a diffraction peak of a catalyst metal component in X-ray diffraction (XRD) spectroscopy or as an average value of a particle diameter of catalyst metal particles examined from a transmission electron microscope (TEM). In this description, the "average particle diameter of catalyst metal particles" is an average value of a particle diameter of catalyst components examined from a transmission electron microscope for a demographically significant number (for example, at least 203) of samples.

In this embodiment, a catalyst content per unit catalyst-coated area ($mg/cm^2$) is not particularly limited so long as a sufficient dispersibility of catalyst on a support and power generation performance can be obtained. For example, the catalyst content is in the range of 0.01 to 1 $mg/cm^2$. However, in the case where the catalyst contains platinum or a platinum-containing alloy, a platinum content per unit catalyst-coated area is preferably 0.5 $mg/cm^2$ or less. The usage of expensive noble metal catalyst represented by platinum (Pt) or a platinum alloy induces an increased cost of a fuel cell. Therefore, it is preferable to reduce the cost by decreasing an amount (platinum content) of the expensive platinum to the above-described range. A lower limit is not particularly limited so long as power generation performance can be attained, and for example, the lower limit value is 0.01 $mg/cm^2$ or more. The content of the platinum is more preferably in the range of 0.02 to 0.4 $mg/cm^2$. In this embodiment, since the activity per catalyst weight can be improved by controlling the pore structure of the support, the amount of an expensive catalyst can be reduced.

In this description, an inductively coupled plasma emission spectroscopy (ICP) is used for measurement (determination) of a "content of catalyst (platinum) per unit catalyst-coated area ($mg/cm^2$)". A method of obtaining a desired "content of catalyst (platinum) per unit catalyst-coated area ($mg/cm^2$)" can be easily performed by the person skilled in the art, and the content can be adjusted by controlling a slurry composition (catalyst concentration) and a coated amount.

A supported amount (in some cases, referred to as a support ratio) of a catalyst on a support is preferably 50 wt % or less, more preferably 30 wt % or less, with respect to a total amount of the catalyst support (that is, the support and the catalyst). The supported amount within the aforementioned range is preferable in terms of sufficient dispersibility of a catalyst component on a support, improved power generation performance, economical merit, and catalytic activity per unit weight. A lower limit of the supported amount is not particularly limited, but is preferably 5 wt % or more.

The acidic group of the catalyst according to the present invention is not particularly limited, but it is preferably at least one selected from the group consisting of a hydroxyl group, a lactone group, and a carboxyl group. Such an acidic group can efficiently attain the above-described effects.

An amount of an acidic group of the catalyst per support weight is 0.75 mmol/g support or less. If the amount of the acidic group exceeds 0.75 mmol/g support, too much amount of water exists in the vicinity of the catalyst metals, to decrease oxygen reduction reaction activity, and to degrade catalyst activity. The amount of the acidic group is preferably is less than 0.7 mmol/g support, more preferably 0.6 mmol/g support or less, even more preferably 0.4 mmol/g support or less. A lower limit of the acidic group is not particularly limited, but it is preferably 0.1 mmol/g support or more, more preferably 0.2 mmol/g support or more.

The amount of the acidic group can be measured by a titration method using an alkali compound, and specifically, it can be measured by the methods disclosed in Examples.

A method of introducing an acidic group to a catalyst is not particularly limited. For example, a wetting method which comprises immersing a support (catalyst support) on which a catalyst metal(s) is supported in an oxidizing solution including an oxidizing agent or heat-treatment of a catalyst support can be employed. The heat-treatment will be described later in detail.

[Catalyst Layer]

As described above, the catalyst of the present invention exhibit a high catalytic activity and in other words, catalyst reaction can be promoted. Therefore, the catalyst of the present invention can be advantageously used for an electrode catalyst layer for fuel cell. Namely, the present invention provides an electrode catalyst layer for fuel cell including the catalyst and the electrode catalyst according to the present invention.

As illustrated in FIG. 2, in the catalyst layer according to the present invention, although the catalyst is coated with the electrolyte 26, the electrolyte 26 does not enter the pores 24 of the catalyst (support 23). Therefore, although the catalyst metal 22 on the surface of the support 23 is in contact with the electrolyte 26, the catalyst metal 22 supported in the pore 24 is not in contact with the electrolyte 26. The catalyst metal in the pore forms three-phase boundary with an oxygen gas and water in a state that the catalyst metal is not in contact with the electrolyte, so that a reaction active area of the catalyst metals can be secured.

Although the catalyst according to the present invention may exist either in a cathode catalyst layer or an anode catalyst layer, the catalyst is preferably used in a cathode catalyst layer. As described above, although the catalyst according to the present invention is not in contact with the electrolyte, the catalyst can be effectively used by forming three-phase boundary of the catalyst and water. This is because water is formed in the cathode catalyst layer.

An electrolyte is not particularly limited, but it is preferably an ion-conductive polymer electrolyte. Since the polymer electrolyte serves to transfer protons generated in the vicinity of the catalyst active material on a fuel electrode side, the polymer electrolyte is also referred to as a proton conductive polymer.

The polymer electrolyte is not particularly limited, but well-known knowledge in the art can be appropriately referred to. The polymer electrolytes are mainly classified into fluorine-based polymer electrolytes and hydrocarbon-based polymer electrolytes depending on a type of an ion-exchange resin as a constituent material.

As an ion-exchange resin constituting the fluorine-based polymer electrolyte, for example, perfluorocarbon sulfonic acid based polymers such as Nafion (registered trademark, produced by DuPont), Aciplex (registered trademark, produced by Asahi Kasei Co., Ltd.), and Flemion (registered trademark, produced by Asahi Glass Co., Ltd.), perfluorocarbon phosphoric acid based polymers, trifluorostyrene sulfonic acid based polymers, ethylene tetrafluoroethylene-g-styrene sulfonic acid based polymers, ethylene-tetrafluoroethylene copolymers, polyvinylidene fluoride-perfluorocarbon sulfonic acid based polymers, and the like may be exemplified. In terms excellent heat resistance, chemical stability, durability, and mechanical strength, the fluorine-based polymer electrolyte is preferably used, and a fluorine-based polymer electrolyte formed of a perfluorocarbon sulfonic acid based polymer is particularly preferably used.

As a hydrocarbon-based electrolyte, sulfonated polyether sulfones (S-PES), sulfonated polyaryl ether ketones, sulfonated polybenzimidazole alkyls, phosphonated polybenzimidazole alkyls, sulfonated polystyrenes, sulfonated polyether ether ketones (S-PEEK), sulfonated polyphenylenes (S-PPP), and the like may be exemplified. In terms of manufacturing advantages such as inexpensive raw materials, simple manufacturing processes, and high selectivity of materials, a hydrocarbon-based polymer electrolyte is preferably used. These ion-exchange resins may be singly used, or two or more resins may be used together. In addition, the material is not limited to the above-described material, but another material may be used.

With respect to the polymer electrolyte which serves to transfer protons, proton conductivity is important. In the case where EW of a polymer electrolyte is too large, ion conductivity with in the entire catalyst layer would be decreased. Therefore, the catalyst layer according to the embodiment preferably includes a polymer electrolyte having a small EW. Specifically, catalyst layer according to the embodiment preferably includes a polymer electrolyte having an EW of 1500 g/eq. or less, more preferably includes a polymer electrolyte having an EW of 1200 g/eq. or less, and particularly preferably includes a polymer electrolyte having an EW of 1000 g/eq. or less.

On the other hand, in the case where the EW is too small, since hydrophilicity is too high, water is hard to smoothly move. Due to such a point of view, the EW of polymer electrolyte is preferably 500 or more. The EW (Equivalent Weight) represents an equivalent weight of an exchange group having proton conductivity. The equivalent weight is a dry weight of an ion exchange membrane per 1 eq. of ion exchange group, and is represented in units of "g/eq."

It is preferable that the catalyst layer includes two types or more of polymer electrolytes having different EWs in a power generation surface, and in this case, among the polymer electrolytes, the polymer electrolyte having the lowest EW is used in an area where relative humidity of a gas in a passage is 90% or less. By employing such material arrangement, resistance is decreased irrespective of a current density area, so that cell performance can be improved. The EW of polymer electrolyte used in the area where relative humidity of the gas in a passage is 90% or less, that is, EW of polymer electrolyte having the lowest EW is preferably 900 g/eq. or less. By this, the above-described effects can be further more certainly and more remarkably attained.

The polymer electrolyte having the lowest EW is preferably used in an area of which temperature is higher than an average temperature of inlet and outlet for cooling water. By this, resistance is decreased irrespective of a current density area, so that cell performance can be further improved.

In terms decreased resistance value of a fuel cell system, the polymer electrolyte having the lowest EW is preferably provided in an area within the range of $3/5$ or less of the passage length from a gas supply inlet of at least one of a fuel gas and an oxidant gas.

The catalyst layer according to the embodiment may include, between the catalyst and the polymer electrolyte, a liquid proton conducting material capable of connecting the catalyst and the polymer electrolyte in a proton conductible state. By introducing the liquid proton conducting material, a proton transport path through the liquid proton conducting material is provided between the catalyst and the polymer electrolyte, so that protons necessary for the power generation can be efficiently transported on the surface of the catalyst. By this, availability of the catalyst is improved, and thus an amount of used catalyst can be reduced while maintaining power generation performance. The liquid proton conducting material may be interposed between the catalyst and the polymer electrolyte. The liquid proton conducting material may be disposed in pores (secondary pores) between porous supports in a catalyst layer or may be disposed in pores (micropores or mesopores: primary pores) in porous supports.

The liquid proton conducting material is not particularly limited if the material has ion conductivity and has a function of forming a proton transport path between the catalyst and the polymer electrolyte. Specifically, water, aprotic ionic liquid, an aqueous solution of perchloric acid, an aqueous solution of nitric acid, an aqueous solution of formic acid, an aqueous solution of acetic acid, and the like may be exemplified.

In the case of using water as the liquid proton conducting material, the water can be introduced as the liquid proton conducting material into the catalyst layer by wetting the catalyst layer with a small amount of liquid water or a humidified gas before the start of power generation. In addition, water generated through electrochemical reaction during the operation of a fuel cell may be used as the liquid proton conducting material. Therefore, in a state where a fuel cell starts to be operated, the liquid proton conducting material is not necessarily retained. For example, a surface distance between the catalyst and the electrolyte is preferably set to be a diameter of an oxygen ion constituting a water molecule, that is, 0.28 nm or more. By maintaining such a distance, water (liquid proton conducting material) can be interposed between the catalyst and the polymer electrolyte (in the liquid conducting material retaining portion) while maintaining the non-contact state between the catalyst and the polymer electrolyte, so that a proton transport path can be secured by water therebetween.

In the case of using a material such as an ionic liquid other than water as the liquid proton conducting material, the ionic liquid, the polymer electrolyte, and the catalyst are preferably allowed to be dispersed in a solution in the preparation of a catalyst ink. However, the ionic liquid may be added at the time of coating a catalyst layer substrate with a catalyst.

In the catalyst according to the present invention, a total area of the catalyst which is in contact with the polymer electrolyte is set to be smaller than a total area of the catalyst exposed to the liquid conducting material retaining portion.

Comparison of these areas can be performed, for example, by obtaining a magnitude relationship between capacitance of an electrical double layer formed in a catalyst-polymer electrolyte interface and capacitance of an electrical double layer formed in a catalyst-liquid proton conducting material interface in a state where the liquid conducting material retaining portion is filled with the liquid proton conducting material. Namely, since capacitance of an electrical double layer is proportional to an area of an electrochemically effective interface, if the capacitance of the electrical double layer formed in the catalyst-electrolyte interface is smaller than the capacitance of the electrical double layer formed in the catalyst-liquid proton conducting material interface, a contact area of the catalyst with the electrolyte is smaller than an area thereof exposed to the liquid conducting material retaining portion.

Herein, a measuring method for capacitance of an electrical double layer formed in a catalyst-electrolyte interface and capacitance of an electrical double layer formed in a catalyst-liquid proton conducting material interface, that is, a magnitude relationship between a contact area of the catalyst with the electrolyte and a contact area of the catalyst and the liquid proton conducting material (determination method for a magnitude relationship between a contact area of the catalyst and the electrolyte and an area of the catalyst exposed to the liquid conducting material retaining portion) will be described.

Namely, in the catalyst layer according to the embodiment, the following four types of interfaces can contribute as capacitance of electrical double layer (Cdl):

(1) catalyst-polymer electrolyte (C-S)
(2) catalyst-liquid proton conducting material (C-L)
(3) porous support-polymer electrolyte (Cr-S)
(4) porous support-liquid proton conducting material (Cr-L)

As described above, since capacitance of an electrical double layer is proportional to an area of an electrochemically effective interface, $Cdl_{C-S}$ (capacitance of an electrical double layer in a catalyst-polymer electrolyte interface) and $Cdl_{C-L}$ (capacitance of an electrical double layer in a catalyst-liquid proton conducting material interface) may be obtained. Therefore, the contribution of the four types of interfaces to capacitance of an electrical double layer (Cdl) can be identified as follows.

First, for example, under a high humidity condition such as 100% RH and under a lower humidity condition such as 10% RH or less, each capacitance of electrical double layers is measured. As a measurement method for the capacitance of electrical double layer, cyclic voltammetry, electrochemical impedance spectroscopy, or the like may be exemplified. From the comparison, the contribution of the liquid proton conducting material (in this case, "water"), that is, the above-described contributions (2) and (4) can be identified.

In addition, the contributions to capacitance of an electrical double layer can be identified by deactivating a catalyst, for example, in the case of using Pt as the catalyst, by deactivating the catalyst by supply CO gas to an electrode to be measured to allow CO to be adsorbed on the surface of Pt. In this state, as described above, under the high humidity condition and under the low humidity condition, each capacitance of electrical double layers is measured by the same method, and from the comparison, the contributions of the catalyst, that is, the above-described contributions (1) and (2) can be identified.

By using the above-described method, all the contributions (1) to (4) described above can be identified, the capacitance of the electrical double layer in the interface between the catalyst and the polymer electrolyte and the capacitance of the electrical double layer in the interface between the catalyst and the liquid proton conducting material can be obtained.

Namely, a measurement value (A) in a highly-humidified state can be regarded as capacitance of electrical double layer formed in all the interfaces (1) to (4), and a measurement value (B) in a lowly-humidified state can be regarded as capacitance of the electrical double layer formed in the interfaces (1) and (3). In addition, a measurement value (C) in a catalyst-deactivated and highly-humidified state can be regarded as capacitance of the electrical double layer formed in the interfaces (3) and (4), and a measurement value (D)

in a catalyst-deactivated and lowly-humidified state can be regarded as capacitance of the electrical double layer formed in the interface (3).

Therefore, the difference between A and C can be regarded as the capacitance of the electrical double layer formed in the interfaces (1) and (2), and the difference between B and D can be regarded as the capacitance of the electrical double layer formed in the interface (1). Next, by calculating the difference between these values, i.e., (A-C)-(B-D), the capacitance of the electrical double layer formed in the interface (2) can be obtained. In addition, a contact area of the catalyst with the polymer electrolyte or an exposed area thereof to the conducting material retaining portion can be obtained by, for example, TEM (transmission electron microscope) tomography besides the above-described method.

A covering ratio of a catalyst with an electrolyte is 0.5 or less, preferably 0.4 or less, more preferably 0.2 or less (lower limit: 0). If the covering ratio exceeds 0.5, the oxygen reduction reaction activity is decreased, so that the catalyst activity is decreased.

The covering ratio with the electrolyte can be calculated from capacitance of an electrical double layer, and specifically, the covering ratio can be calculated according to the method disclosed in Examples.

If necessary, the catalyst layer may contain additives of a water repellent such as polytetrafluoroethylene, polyhexafluoropropylene, and tetrafluoroethylene-hexafluoropropylene copolymer, a dispersant such as a surfactant, a thickener such as glycerin, ethylene glycol (EG), polyvinyl alcohol (PVA), and propylene glycol (PG), a pore-forming agent, or the like.

A thickness (as a dried thickness) of the catalyst layer is preferably in the range of 0.05 to 30 μm, more preferably in the range of 1 to 20 μm, even more preferably in the range of 2 to 15 μm. The thickness can be applied to both of the cathode catalyst layer and the anode catalyst layer. However, the thickness of the cathode catalyst layer and the thickness of the anode catalyst layer may be equal to or different from each other.

(Method of Manufacturing Catalyst Layer)

Hereinafter, a method for manufacturing the catalyst layer will be described as an exemplary embodiment, but the scope of the present invention is not limited to the following embodiment. In addition, all the conditions for the components and the materials of the catalyst layer are as described above, and thus, the description thereof is omitted.

First, a support (in this description, also referred to as a "porous support" or a "conductive porous support") is prepared, and subjected to heat-treatment to control a pore structure. Specifically, the support may be manufactured as described above in the method of manufacturing the support. By this, a support having a defined specific surface area can be obtained.

Conditions in the heat-treatment may be varied depending on the material, and the conditions may be appropriately selected so as to obtain a desired specific surface area. The heat-treatment conditions may be determined according to the material while checking a pore structure, and the skilled in the art can easily determine the conditions. Although a technique of graphitizing a support by heat-treatment at a high temperature has been heretofore known in the art, most of pores in a support can be blocked by the conventional heat-treatment, and control of a pore structure at a micro level (wide, shallow primary pores) in the vicinity of a catalyst has not been performed.

Next, the catalyst is supported on the porous support, so that a catalyst powder is prepared. The supporting of the catalyst on the porous support can be performed by a well-known method. For example, a well-known method such as an impregnation method, a liquid phase reduction supporting method, an evaporation drying method, a colloid adsorption method, a spray pyrolysis method, or reverse micelle (micro-emulsion method) may be used.

Next, the resultant catalyst powder is subjected to heat-treatment in a hydrogen ambience, to reduce an acidic group. A temperature in the heat-treatment is preferably in the range of 200 to 1400° C., and a time in the heat-treatment is preferably in the range of 1 to 10 hours.

Subsequently, a catalyst ink containing the catalyst powder having an acidic group introduced thereto, polymer electrolyte, and a solvent is prepared. As the solvent, there is no particular limitation. A typical solvent used for forming a catalyst layer may be similarly used. Specifically, water such as tap water, pure water, ion-exchanged water, distilled water, cyclohexanol, a lower alcohol having 1 to 4 carbons such as methanol, ethanol, n-propanol, isopropanol, n-butanol, sec-butanol, isobutanol, and tert-butanol, propylene glycol, benzene, toluene, xylene, or the like may be used. Besides, acetic acid butyl alcohol, dimethyl ether, ethylene glycol, or the like may be used as a solvent. These solvents may be used alone or may be used in a state of a mixture of two or more solvents.

An amount of solvent for preparing the catalyst ink is not particularly limited so long as the electrolyte can be completely dissolved. Specifically, a concentration (a solid content) of the catalyst powder and the polymer electrolyte is preferably in the range of 1 to 50 wt % in the electrode catalyst ink, more preferably in the range of about 5 to 30 wt %.

In the case of using an additive such as a water repellent, a dispersant, a thickener, and a pore-forming agent, the additive may be added to the catalyst ink. In this case, an added amount of the additive is not particularly limited so long as it does not interfere with the above-described effects by the present invention. For example, the added amount of the additive is preferably in the range of 5 to 20 wt %, with respect to the total weight of the electrode catalyst ink.

Next, a surface of a substrate is coated with the catalyst ink. A method of coating the substrate is not particularly limited, but a well-known method may be used. Specifically, a well-known method such as a spray (spray coat) method, a Gulliver printing method, a die coater method, a screen printing method, or a doctor blade method can be used.

As the substrate coated with the catalyst ink, a solid polymer electrolyte membrane (electrolyte layer) or a gas diffusion substrate (gas diffusion layer) may be used. In this case, after the catalyst layer is formed on a surface of a solid polymer electrolyte membrane (electrolyte layer) or a gas diffusion substrate (gas diffusion layer), the resultant laminate may be used as it is for manufacturing a membrane electrode assembly. Alternatively, as the substrate, a peelable substrate such as a polytetrafluoroethylene (PTFE) [Teflon (registered trademark)] sheet can be used, and after a catalyst layer is formed on the substrate, the catalyst layer portion can be peeled off from the substrate, so that the catalyst layer may be obtained.

Finally, the coat layer (film) of the catalyst ink is dried under an air ambience or under an inert gas ambience at a temperature ranging from room temperature to 150° C. for a time ranging from 1 to 60 minutes. By this, the catalyst layer can be formed.

(Membrane Electrode Assembly)

According to another embodiment of the present invention, provided is a membrane electrode assembly for fuel cell which comprises a solid polymer electrolyte membrane 2, a cathode catalyst layer disposed on one side of the electrolyte membrane, an anode catalyst layer disposed on the other side of the electrolyte membrane, and a pair of gas diffusion layers (4a, 4c) interposing the electrolyte membrane 2, the anode catalyst layer 3a, and the cathode catalyst layer 3c. In the membrane electrode assembly, at least one of the cathode catalyst layer and the anode catalyst layer is the catalyst layer according to the embodiment described above.

However, by taking into consideration necessity of improved proton conductivity and improved transport characteristic (gas diffusibility) of a reaction gas (particularly, $O_2$), at least the cathode catalyst layer is preferably the catalyst layer according to the embodiment described above. However, the catalyst layer according to the embodiment is not particularly limited. The catalyst layer may be used as the anode catalyst layer or may be used as the cathode catalyst layer and the anode catalyst layer.

According to further embodiment of the present invention, provided is a fuel cell including the membrane electrode assembly according to the embodiment. Namely, according to one aspect, the present invention provides a fuel cell comprising a pair of anode separator and cathode separator interposing the membrane electrode assembly according to the embodiment.

Hereinafter, members of a PEFC 1 using the catalyst layer according to the embodiment will be described with reference to FIG. 1. However, the present invention has features with respect to the catalyst and the catalyst layer. Therefore, among members constituting the fuel cell, specific forms of members other than the catalyst layer may be appropriately modified with reference to well-known knowledge in the art.

(Electrolyte Membrane)

An electrolyte membrane is configured with a solid polymer electrolyte membrane 2 in the same form illustrated in, for example, FIG. 1. The solid polymer electrolyte membrane 2 serves to selectively transmit protons generated in an anode catalyst layer 3a to a cathode catalyst layer 3c in the thickness direction during the operation of the PEFC 1. In addition, the solid polymer electrolyte membrane 2 also serves as a partition wall for preventing a fuel gas supplied to an anode side from being mixed with an oxidant gas supplied to a cathode side.

An electrolyte material constituting the solid polymer electrolyte membrane 2 is not particularly limited, but well-known knowledge in the art may be appropriately referred to. For example, the fluorine-based polymer electrolyte or the hydrocarbon-based polymer electrolyte described above as the polymer electrolyte can be used. There is no need to use the polymer electrolyte which is necessarily the same as the polymer electrolyte used for the catalyst layer.

A thickness of the electrolyte layer is not particularly limited, but it may be determined by taking into consideration characteristics of the obtained fuel cell. The thickness of the electrolyte layer is typically in the range of about 5 to 300 km. If the thickness of the electrolyte layer is within such a range, balance between strength during the film formation or durability during the use and output characteristics during the use can be appropriately controlled.

(Gas Diffusion Layer)

A gas diffusion layer (anode gas diffusion layer 4a, cathode gas diffusion layer 4c) serves to facilitate diffusion of a gas (fuel gas or oxidant gas) supplied through a gas passage (6a, 6c) of a separator to a catalyst layer (3a, 3c) and also serves as an electron conducting path.

A material constituting a substrate of the gas diffusion layers (4a, 4c) is not particularly limited, but well-known knowledge in the related art may be appropriately referred to. For example, a sheet-shaped material having conductivity and porous property such as a fabric made of carbon, a sheet-shaped paper, felt, and a nonwoven fabric may be exemplified. A thickness of the substrate may be appropriately determined by considering characteristics of the obtained gas diffusion layer. The thickness of the substrate may be in the range of about 30 to 500 µm. If the thickness of the substrate is within such a range, balance between mechanical strength and diffusibility of gas, water, and the like can be appropriately controlled.

The gas diffusion layer preferably includes a water repellent for the purpose of preventing a flooding phenomenon or the like by improving water repellent property. The water repellent is not particularly limited, but fluorine-based polymer materials such as polytetrafluoroethylene (PTFE), polyvinylidene fluoride (PVdF), polyhexafluoropropylene, and tetrafluoroethylene-hexafluoropropylene copolymer (FEP), polypropylene, polyethylene, and the like may be exemplified.

In order to further improve water repellent property, the gas diffusion layer may include a carbon particle layer (microporous layer (MPL), not shown) configured with an assembly of carbon particles including a water repellent provided at the catalyst-layer side of the substrate.

Carbon particles included in the carbon particle layer are not particularly limited, but well-known materials in the art such as carbon black, graphite, and expandable graphite may be appropriately employed. Among the materials, due to excellent electron conductivity and a large specific surface area, carbon black such as oil furnace black, channel black, lamp black, thermal black, and acetylene black can be preferably used. An average particle diameter of the carbon particles may be set to be in the range of about 10 to 100 nm. By this, high water-repellent property by a capillary force can be obtained, and contacting property with the catalyst layer can be improved.

As the water repellent used for the carbon particle layer, the above-described water repellent may be exemplified. Among the materials, due to excellent water repellent property and excellent corrosion resistance during the electrode reaction, the fluorine-based polymer material can be preferably used.

A mixing ratio of the carbon particles and the water repellent in the carbon particle layer may be set to be in the range of weight ratio of about 90:10 to 40:60 (carbon particle: water repellent) by taking into consideration balance between water repellent property and electron conductivity. Meanwhile, a thickness of the carbon particle layer is not particularly limited, but it may be appropriately determined by taking into consideration water repellent property of the obtained gas diffusion layer.

(Method of Manufacturing Membrane Electrode Assembly)

A method of manufacturing a membrane electrode assembly is not particularly limited, and a well-known method in the art may be used. For example, a method which comprises transferring a catalyst layer to a solid polymer electrolyte membrane by using a hot press, or coating a solid polymer electrolyte membrane with a catalyst layer and drying the coating, and joining the resulting laminate with gas diffusion layers, or a method which comprises coating a microporous layer (in the case of not including a microporous layer, one surface of a substrate layer) of a gas diffusion layer with a catalyst layer in advance and drying the resulting product to produce two gas diffusion electrodes (GDEs), and joining both surfaces of the solid polymer electrolyte membrane with the two gas diffusion electrodes by using a hot press can be used. The coating and joining conditions by hot press and the like may be appropriately adjusted according to a type of the polymer electrolyte (perfluorosulfonic acid-based or hydrocarbon-based) in the solid polymer electrolyte membrane or the catalyst layer.

(Separator)

In the case of configuring a fuel cell stack by connecting a plurality of unit fuel cells of polymer electrolyte fuel cells in series, a separator serves to electrically connect the cells in series. The separator also serves as a partition wall for separating a fuel gas, an oxidant gas, and a coolant from each other. In order to secure a passage thereof, as described above, gas passages and coolant passages are preferably installed in each of the separators. As a material constituting the separator, well-known materials in the art of carbon such as dense carbon graphite and a carbon plate, a metal such as a stainless steel, or the like can be employed without limitation. A thickness or size of the separator, a shape or size of the installed passages, and the like are not particularly limited, but they can be appropriately determined by taking into consideration desired output characteristics and the like of the obtained fuel cell.

A manufacturing method for the fuel cell is not particularly limited, and well-known knowledge in the art in the field of fuel cell may be appropriately referred to.

Furthermore, in order that the fuel cell can generate a desired voltage, a fuel cell stack may be formed by connecting a plurality of membrane electrode assemblies in series through a separator. A shape and the like of the fuel cell are not particularly limited, and they may be appropriately determined so as to obtain desired cell characteristics such as a voltage.

The above-described PEFC or membrane electrode assembly uses the catalyst layer having excellent power generation performance and excellent durability. Therefore, the PEFC or membrane electrode assembly shows excellent power generation performance and durability.

The PEFC according to the embodiment and the fuel cell stack using the PEFC can be mounted on a vehicle, for example, as a driving power source.

EXAMPLE

The effects of the present invention will be described with reference to the following Examples and Comparative Examples. However, the scope of the present invention is not limited to the Examples.

Example 1

Black Pearls (registered trademark) (support A) having a BET specific surface area of 1440 m$^2$/g was prepared.

The support A was used, and platinum (Pt) having an average particle diameter of 4 nm as the catalyst metal was supported on the support A at a support ratio of 50 wt %, to prepare a catalyst powder A. To be specific, 46 g of the support A was immersed into 1000 g of a dinitrodiammine platinum nitric acid solution having a platinum concentration of 4.6 wt % (platinum content: 46 g), and after stirring, 100 mL of 100% of ethanol as a reducing agent was added thereto. The resultant mixture was stirred and mixed at a boiling point for 7 hours, so that platinum was supported on the support A. Next, by filtering and drying, the catalyst powder A having a support ratio of 50 wt % was obtained. After that, the resulting product was maintained in a hydrogen ambience at a temperature of 900° C. for 1 hour, to yield a catalyst powder A.

The resultant catalyst powder A was measured for a BET specific surface area, to be 1291 m$^2$/g support.

The catalyst powder A having the acidic group and an ionomer dispersion liquid (Nafion (registered trademark) D2020, EW=1100 g/mol, produced by DuPont) as a polymer electrolyte were mixed at a weight ratio of the carbon support and the ionomer of 0.9. Next, a cathode catalyst ink was prepared by adding a n-propyl alcohol solution (50%) as a solvent with a solid content (Pt+carbon support+ionomer) of 7 wt %.

Ketjen Black (particle diameter: 30 to 60 nm) was used as a support, and platinum (Pt) having an average particle diameter of 2.5 nm as the catalyst metal was supported thereon at a support ratio of 50 wt %, to obtain a catalyst powder. The catalyst powder and an ionomer dispersion liquid (Nafion (registered trademark) D2020, EW=1100 g/mol, produced by DuPont) as the polymer electrolyte were mixed at a weight ratio of the carbon support and the ionomer of 0.9. Next, an anode catalyst ink was prepared by adding a n-propyl alcohol solution (50%) as a solvent with a solid content (Pt+carbon support+ionomer) of 7%.

Next, a gasket (Teonex produced by Teijin DuPont Film, thickness: 25 µm (adhesive layer: 10 km)) was arranged around both surfaces of a polymer electrolyte membrane (NAFION (registered trademark) NR211 produced by DuPont, thickness: 25 µm). Then, an exposed portion of one surface of the polymer electrolyte membrane was coated with the catalyst ink having a size of 5 cm×2 cm by a spray coating method. The catalyst ink was dried by maintaining the stage where the spray coating was performed at a temperature of 60° C., to obtain a cathode catalyst layer. At this time, a supported amount of platinum is 0.35 mg/cm$^2$. Next, similarly to the cathode catalyst layer, an anode catalyst layer was formed by spray coating and heat-treatment on the electrolyte membrane, to obtain a membrane electrode assembly (1) (MEA (1)) of this example.

Example 2

A support B having a BET specific surface area of 1772 m$^2$/g was prepared. Specifically, the support B was prepared by the method disclosed in WO 2009/75264 or the like.

The support B was used, and platinum (Pt) having an average particle diameter of 4 nm as the catalyst metal was supported on the support B at a support ratio of 30 wt %, to prepare a catalyst powder B. To be specific, 138 g of the support A was immersed into 1000 g of a dinitrodiammine platinum nitric acid solution having a platinum concentration of 4.6 wt % (platinum content: 46 g), and after stirring, 100 mL of 100% of ethanol as a reducing agent was added thereto. The resultant mixture was stirred and mixed at a boiling point for 7 hours, so that platinum was supported on the support B. Next, by filtering and drying, the catalyst powder B having a support ratio of 30 wt % was obtained. After that, the resulting product was maintained in a hydrogen ambience at a temperature of 900° C. for 1 hour, to yield a catalyst powder B.

The resultant catalyst powder B was measured for a BET specific surface area, to be 1753 m$^2$/g support.

A membrane electrode assembly (2) (MEA (2)) was manufactured by the same processes as those of Example 1, except that the catalyst powder B thus obtained was used instead of the catalyst powder A.

Comparative Example 1

Ketjen Black EC300J (produced by Ketjen Black International Co., Ltd.) (support C) having a BET specific surface area of 720 m$^2$/g was provided.

The support C was used, and platinum (Pt) having an average particle diameter of 5 nm as the catalyst metal was supported on the support C at a support ratio of 50 wt %, to prepare a catalyst powder C. To be specific, 46 g of the support A was immersed into 1000 g of a dinitrodiammine platinum nitric acid solution having a platinum concentration of 4.6 wt % (platinum content: 46 g), and after stirring, 100 mL of 100% of ethanol as a reducing agent was added thereto. The resultant mixture was stirred and mixed at a boiling point for 7 hours, so that platinum was supported on the support C. Next, by filtering and drying, the catalyst powder C having a support ratio of 50 wt % was obtained.

The catalyst powder C was subjected to oxidizing solution treatment for adding an acidic group. The catalyst powder C having an acidic group was obtained by immersing the catalyst powder C in 3.0 mol/L of an aqueous nitric acid solution at 80° C. for 2 hours, and thereafter filtering and drying.

The resultant catalyst powder C was measured for a BET specific surface area, to be 7031 m$^2$/g support.

A comparative membrane electrode assembly (1) (Comparative MEA (1)) was manufactured by the same processes as those of Example 1, except that the catalyst powder C thus obtained was used instead of the catalyst powder A.

Comparative Example 2

Ketjen Black EC300J (produced by Ketjen Black International Co., Ltd.) (support D) having a BET specific surface area of 720 m$^2$/g was provided.

The support D was used, and platinum (Pt) having an average particle diameter of 5 nm as the catalyst metal was supported on the support D at a support ratio of 50 wt %, to prepare a catalyst powder D. To be specific, 46 g of the support D was immersed into 1000 g of a dinitrodiammine platinum nitric acid solution having a platinum concentration of 4.6 wt % (platinum content: 46 g), and after stirring, 100 mL of 100% of ethanol as a reducing agent was added thereto. The resultant mixture was stirred and mixed at a boiling point for 7 hours, so that platinum was supported on the support D. Next, by filtering and drying, the catalyst powder D having a support ratio of 50 wt % was obtained.

After that, the resulting product was maintained in a hydrogen ambience at a temperature of 900° C. for 1 hour, to yield a catalyst powder D. The resultant catalyst powder D was measured for a BET specific surface area, to be 711 m$^2$/g support.

A comparative membrane electrode assembly (2) (Comparative MEA (2)) was manufactured by the same processes as those of Example 1, except that the catalyst powder D thus obtained was used instead of the catalyst powder A.

Comparative Example 3

Black Pearls (registered trademark) (support E) having a BET specific surface area of 1440 m$^2$/g was provided.

The support E was used, and platinum (Pt) having an average particle diameter of 4 nm as the catalyst metal was supported on the support C at a support ratio of 50 wt %, to prepare a catalyst powder E. To be specific, 46 g of the support E was immersed into 1000 g of a dinitrodiammine platinum nitric acid solution having a platinum concentration of 4.6 wt % (platinum content: 46 g), and after stirring, 100 mL of 100% of ethanol as a reducing agent was added thereto. The resultant mixture was stirred and mixed at a boiling point for 7 hours, so that platinum was supported on the support E. Next, by filtering and drying, the catalyst powder E having a support ratio of 50 wt % was obtained.

The catalyst powder E was subjected to oxidizing solution treatment for adding an acidic group. The catalyst powder E having an acidic group was obtained by immersing the catalyst powder C in 3.0 mol/L of an aqueous nitric acid solution at 80° C. for 2 hours, and thereafter filtering and drying.

The resultant catalyst powder E was measured for a BET specific surface area, to be 1236 m$^2$/g support.

A comparative membrane electrode assembly (3) (Comparative MEA (3)) was manufactured by the same processes as those of Example 1, except that the catalyst powder E thus obtained was used instead of the catalyst powder A.

Comparative Example 4

A support F having a BET specific surface area of 1772 m$^2$/g was provided. Specifically, the support F was prepared by the method disclosed in WO 2009/75264 or the like.

The support F was used, and platinum (Pt) having an average particle diameter of 4 nm as the catalyst metal was supported on the support F at a support ratio of 30 wt %, to prepare a catalyst powder F. To be specific, 138 g of the support F was immersed into 1000 g of a dinitrodiammine platinum nitric acid solution having a platinum concentration of 4.6 wt % (platinum content: 46 g), and after stirring, 100 mL of 100% of ethanol as a reducing agent was added thereto. The resultant mixture was stirred and mixed at a boiling point for 7 hours, so that platinum was supported on the support F. Next, by filtering and drying, the catalyst powder B having a support ratio of 30 wt % was obtained.

The catalyst powder F was subjected to oxidizing solution treatment for adding an acidic group. The catalyst powder F having an acidic group was obtained by immersing the catalyst powder F in 3.0 mol/L of an aqueous nitric acid solution at 80° C. for 2 hours, and thereafter filtering and drying.

The resultant catalyst powder F was measured for a BET specific surface area, to be 1743 m$^2$/g support.

A comparative membrane electrode assembly (4) (Comparative MEA (4)) was manufactured by the same processes as those of Example 2, except that the catalyst powder F thus obtained was used instead of the catalyst powder A.

[Measurement of Amount of Acidic Group]

An amount of an acidic group was measured by a titration method as follows. To be specific, first, 2.5 g of a catalyst powder having an acidic group was washed with 1 L of warm pure water, and dried. After drying, the catalyst powder was weighed so as to yield an amount of carbon contained in the catalyst having the acidic group of 0.25 g. The catalyst thus weighed was mixed with 55 mL of water, stirred for 10 minutes, and then subjected to ultrasonic dispersion for 2 minutes. Next, the catalyst dispersion liquid was moved to a glove box which had been purged with a nitrogen gas, and a nitrogen gas was bubbled for 10 minutes. Next, 0.1 M of an aqueous base solution was excessively introduced into the catalyst dispersion liquid, and the basic solution was subjected to neutralization titration with 0.1 M of hydrochloric acid to quantitatively measure an amount of functional group(s) from the neutralization point. Herein, as the aqueous base solution, three types of NaOH, Na₂CO₃, and NaHCO₃ were used, and the operation of neutralization titration was performed for each type. This is because the different type of the functional group is neutralized for each base used. Namely, NaOH is neutralized with a carboxyl group, a lactone group, and a hydroxyl group; Na₂CO₃ is neutralized with a carboxyl group and a lactone group; and NaHCO₃ is neutralized with a carboxyl group. An amount of acidic group was calculated from the results of the type and amount of three types of base introduced by the titration and the consumed amount of hydrochloric acid. A pH meter was used for identifying the neutralization point. The neutralization point for NaOH was set to pH 7.0, the neutralization point for Na₂CO₃ was set to pH 8.5, and neutralization point for NaHCO₃ was set to pH 4.5. A total amount of the carboxyl group, lactone group and hydroxyl group added to the catalyst was obtained.

[Covering Ratio of Electrolyte]

With respect to a covering ratio of a catalyst metal(s) with an electrolyte, capacitance of an electrical double layer formed in an interface between a solid proton conducting material of a catalyst and a liquid proton conducting material was measured, and a covering ratio of a catalyst by a solid proton conducting material was calculated by the measured capacitance. In the calculation of the covering ratio, a ratio of capacitance of an electrical double layer in a low humidity state to that in a high humidity state was calculated, and measured values in 5% RH and 100% RH conditions as representative humidity states were used.

<Measurement of Capacitance of Electrical Double Layer>

The resultant MEA was respectively measured for capacitance of an electrical double layer in a high humidity state, a low humidity state, a catalyst-deactivated and high humidity state, and a catalyst-deactivated and low humidity state by electrochemical impedance spectroscopy, and contact areas of the catalyst with two proton conducting materials in the electrode catalysts of two fuel cells were compared.

An electrochemical measurement system HZ-3000 (produced by Hokuto Denko Co., Ltd.) and a frequency response analyzer FRA5020 (produced by NF Circuit Design Block Co., Ltd.) were used as a measurement apparatus, and measurement conditions listed in the following Table 1 were employed.

TABLE 1

| Cell Temperature | 30° C. |
|---|---|
| Frequency Range | 20 kHz to 10 mHz |
| Amplitude | ±10 mV |
| Maintaining Potential | 0.45 V |
| Supplied Gas (Counter Electrode/Working Electrode) | H₂/N₂ |
| Temperature (Counter Electrode/Working Electrode) | 5/5% RH to 100/100 RH |

First, the fuel cells were respectively warmed at 30° C. by a heater, the capacitance of electrical double layer was measured in a state where a nitrogen gas and a hydrogen gas which were adjusted in the humidity state listed in Table 1 were supplied to working electrode and counter electrode.

In the measurement of the capacitance of electrical double layer, as shown in the Table 1, a potential of the working electrode was vibrated with an amplitude of ±10 mV in the frequency range of 20 kHz to 10 mHz while maintaining at 0.45 V.

To be specific, real and imaginary parts of impedance at each frequency can be obtained from responses at the time of vibration of a potential of working electrode. Since a relationship between the imaginary part (Z″) and the angular velocity m (transformed from frequency) is expressed by the following Formula, capacitance of the electrical double layer $C_{dl}$ can be obtained by arranging a reciprocal of the imaginary part with respect to the minus square of the angular velocity, and extrapolating an value when the minus square of the angular velocity is 0.

$$C_{dl} = \frac{1}{\omega Z''} - \frac{1}{\omega^2 R_{ct}^2 C_{dl}} \qquad \text{[Formula 1]}$$

The measurement was sequentially performed in the low humidity state and the high humidity state (5% RH→10% RH→90% RH→100% RH conditions).

Next, after the Pt catalyst was deactivated by flowing a nitrogen gas containing CO with a concentration of 1% (volume ratio) at 1 NL/minute for 15 minute or more to the working electrode, capacitance of electrical double layer in the high humidity state and capacitance of electrical double layer in the low humidity state were measured. The results are listed in Table 2. The obtained capacitance of electrical double layer is listed in terms of a value per area of the catalyst layer. In addition, in Table 2, the case of no measurement is shown by "-"

The capacitance of electrical double layer formed in a catalyst-solid proton conducting material (C-S) interface and the capacitance of electrical double layer formed in a catalyst-liquid proton conducting material (C-L) interface were calculated based on the measured values.

In the calculation, the measured values in 5% RH and 100% RH conditions were used as representative values of the capacitance of electrical double layer in the low humidity state and the capacitance of electrical double layer in the high humidity state, respectively.

Experiment 1: Evaluation of Oxygen Reduction Reaction (ORR) Activity

The membrane electrode assemblies (1) to (2) manufactured in Examples 1 to 2 and the comparative membrane electrode assemblies (1) to (4) manufactured in Comparative Examples 1 to 4 were measured for power generation current per surface area of platinum (A/cm² (Pt)) at 0.9 V under the following evaluation conditions. By this, oxygen reduction reaction activity was evaluated.

[Chem. 2]

<Evaluation Conditions>

Temperature: 80° C.

Gas Component: Hydrogen (Anode Side 4 L/min)/Oxygen (Cathode Side 8 L/min)

Relative Humidity: 100% RH/100% RH

Pressure: 150 kPa(abs)/150 kPa(abs)

Voltage Scan Direction: Measurement was performed from voltage at 1 OA to voltage at 0.2 A.

The results are shown in the following Table 2.

TABLE 2

| | Specific Surface Area of Catalyst (m²/g support) | Covering Ratio of Electrolyte | Acidic Group Amount (mmol/g support) | ORR Mass Activity |
|---|---|---|---|---|
| Comparative Example 1 | 703 | 0.5 | 0.8 | 1.00 |
| Comparative Example 2 | 711 | 0.5 | 0.4 | 1.03 |

TABLE 2-continued

| | Specific Surface Area of Catalyst (m²/g support) | Covering Ratio of Electrolyte | Acidic Group Amount (mmol/g support) | ORR Mass Activity |
|---|---|---|---|---|
| Comparative Example 3 | 1236 | — | 1.5 | 1.00 |
| Example 1 | 1291 | 0.35 | 0.6 | 1.20 |
| Comparative Example 4 | 1743 | — | 2.1 | 1.00 |
| Example 2 | 1753 | 0.15 | 0.75 | 1.25 |

It is noted from Table 2 that the catalysts of the present invention excel in oxygen reduction reaction activity.

Experiment 2: Evaluation of Power Generation Performance

The membrane electrode assembly (1) manufactured in Example 1 and the comparative membrane electrode assembly (3) manufactured in Comparative Example 3 were evaluated for power generation performance by measuring voltage (V) at 1.5 A/cm² under the following evaluation conditions.

[Chem. 3]
<Evaluation Conditions>
Temperature: 80° C.
Gas Component: Hydrogen (Anode Side 4 L/min)/Nitrogen (Cathode Side 15 L/min)
Relative Humidity: 100% RH/100% RH
Pressure: 200 kPa(abs)/200 kPa(abs)

Experiment 3: Evaluation of Gas Transport Resistance

The membrane electrode assembly (1) manufactured in Example 1 and the comparative membrane electrode assembly (3) manufactured in Comparative Example 3 were evaluated for gas transport resistance in accordance with the method disclosed in T. Mashio et al. ECS Trans. 11, 529, (2007).

To be specific, a limiting current density (A/cm²) was measured with dilute oxygen. At this time, gas transport resistance (s/m) was calculated from a slope of the limiting current density (A/cm²) relative to a partial pressure (kPa) of oxygen. Table 4 lists relative values obtained when the value of the oxygen transport resistance obtained in Comparative Example 3 is defined as 1.

Experiment 4: Maintaining Ratio of Catalyst Effective Surface Area (ECA) to Initial Period The membrane electrode assembly (1) manufactured in Example 1 and the comparative membrane electrode assembly (3) manufactured in Comparative Example 3 were measured for a maintaining ratio of catalyst effective surface area (ECA) calculated from ECA ratios at a relative humidity of 100% before and after the load cycle durability evaluation (evaluation conditions are shown below). The results are listed in the following Table 3.

[Chem. 4]
<Evaluation Conditions>
Temperature: 80° C.
Gas Component: Hydrogen (Anode Side: 0.5 L/min)/Nitrogen (Cathode Side: 0.5 L/min)
Relative Humidity: 100% RH/100% RH
Pressure: 100 kPa(abs)/100 kPa(abs)
Voltage: 0.6 V-0.95 (1 Cycle)
(Maintained for 3 seconds at each voltage, and performed 50000 cycles)

TABLE 3

| | Specific Surface Area of Catalyst (m²/g support) | Acidic Group Amount (mmol/g support) | Voltage Value at 2.0 A/cm² (V) | Oxygen Transport Resistance | ECA Maintaining Ratio to Initial Period |
|---|---|---|---|---|---|
| Example 1 | 1291 | 0.6 | 0.50 | 0.35 | 0.56 |
| Comparative Example 3 | 1236 | 1.5 | 0.44 | 1.00 | 0.49 |

It is noted from Table 3 that the MEA (1) using the catalyst according to the present invention shows more excellent power generation performance in comparison to the comparative MEA (3) having an amount of acidic groups out of the range as defined in the present invention. In addition, it is noted that the oxygen transport resistance in the catalyst layer was significantly low and the ECA maintaining ratio (durability of the catalyst metals in the catalyst layer) was excellent.

The present application is based on the Japanese Patent Application No. 2013-92930 filed on Apr. 25, 2013, the entire disclosed contents of which are incorporated herein by reference.

The invention claimed is:

1. A cathode catalyst layer for a fuel cell, comprising:
   a cathode catalyst comprising a catalyst support and catalyst metal supported on the catalyst support,
   wherein catalyst metal is supported inside mesopores having a radius of 1 nm or more of the catalyst support,
   wherein a specific surface area of the cathode catalyst per support weight is 1200 m²/g support or more, and
   wherein an amount of an acidic group of the cathode catalyst per support weight is 0.75 mmol/g support or less, and
   an electrolyte,
   wherein catalyst metal, which is present inside the mesopores, is not covered with the electrolyte.

2. The cathode catalyst layer according to claim 1, further comprising:
   catalyst metal covered with the electrolyte,
   wherein a covering ratio of the catalyst metal covered with the electrolyte is less than 0.5.

3. The cathode catalyst layer according to claim 2, wherein the covering ratio of the catalyst metal covered with the electrolyte is 0.4 or less.

4. The cathode catalyst layer according to claim 1, wherein the support includes a metal oxide or carbon.

5. The cathode catalyst layer according to claim 1, wherein the acidic group is at least one selected from the group consisting of a hydroxyl group, a lactone group, and a carboxyl group.

6. The cathode catalyst layer according to claim 1, wherein the catalyst metal is platinum or includes platinum and a metal component other than platinum.

7. The cathode catalyst layer according to claim 1, wherein an amount of the catalyst metal supported on the support is 50 wt % or less.

8. The cathode catalyst layer for the fuel cell set forth in claim 1, wherein the amount of the acidic group of the cathode catalyst per support weight is 0.1 mmol/g support or more.

9. The cathode catalyst layer for the fuel cell set forth in claim 1, wherein the specific surface area of the cathode catalyst per support weight is 1700 m²/g support or more.

10. A membrane electrode assembly for a fuel cell comprising the cathode catalyst layer for the fuel cell set forth in claim 1.

11. A fuel cell comprising the membrane electrode assembly for the fuel cell set forth in claim 10.

12. The fuel cell set forth in claim 11, wherein the fuel cell is a polymer electrolyte fuel cell.

13. A method of manufacturing the cathode catalyst layer set forth in claim 1, comprising:
   supporting the catalyst metal on the catalyst support to obtain a catalyst powder; and
   subjecting the catalyst powder to heat-treatment in a hydrogen atmosphere,
   wherein the heat-treatment is carried out at a range of 900° C. to 1400° C. in temperature.

14. A cathode, comprising:
   a cathode catalyst comprising a catalyst support and catalyst metal supported on the catalyst support,
   wherein catalyst metal is supported inside mesopores having a radius of 1 nm or more of the catalyst support,
   wherein a specific surface area of the cathode catalyst per support weight is 1700 $m^2$/g support or more,
   wherein an amount of an acidic group of the cathode catalyst per support weight is 0.75 mmol/g support or less, and
   wherein catalyst metal, which is present inside the mesopores, is not covered with the electrolyte.

* * * * *